United States Patent Office 3,287,538
Patented Nov. 22, 1966

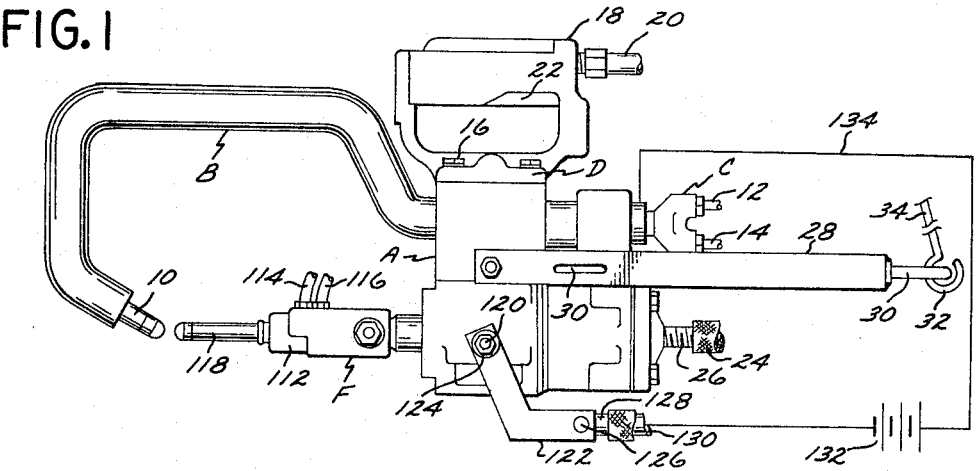

3,287,538
SPOT WELDER
Edward Dicks, 6863 Delta Ave., Long Beach, Calif.
Filed June 3, 1965, Ser. No. 460,891
9 Claims. (Cl. 219—89)

The present invention relates generally to welding, and more particularly to an improved spot welder.

As is well known, spot welders are used in large numbers in many manufacturing plants, and include a fixed water-cooled electrode, and a movable water-cooled electrode. The work pieces to be welded together are disposed between the two electrodes. The movable electrode is then moved into pressure contact with the work pieces to force one thereof into engagement with the fixed electrode if it is not already contacting same, and low voltage, high amperage current thereafter flowing to the work pieces to weld the same together.

Spot welders are easy and convenient to use, but have the operational disadvantage that electric current is supplied to the movable electrode through a heavy woven copper cable that is exposed to the air. Due to the high amperage of the electric current, this copper cable is heated excessively, oxidizes, and has a relatively short life. Upon failure of this cable, the spot welder is rendered inoperative, and requires maintenance attention at a time that may be most inconvenient, especially if the welder is being used on an assembly line. To prevent such breakdowns of previously available spot welders, the cables are frequently replaced long before they would fail, and this precaution further increasing the maintenance cost on the welders.

A major object of the present invention is to provide an improved spot welder that requires no heavy braided copper cable to supply electric current to the movable electrode, and in consequence requires less maintenance attention than previously available devices of this type.

Another object of the invention is to furnish a spot welder in which a lower metallic housing serves the dual function of providing a support for the movable electrode, as well as a means of supplying electric current thereto.

A still further object of the invention is to provide a spot welder that simplifies, renders more efficient, and generally improves, devices of this type.

These and other objects and advantages of the invention will become apparent from the following description of a preferred form thereof, and from the drawing illustrating the same in which:

FIGURE 1 is a side elevational view of the device;

FIGURE 2 is an enlarged longitudinal cross-sectional view of the lower housing;

FIGURE 3 is a transverse cross-sectional view of the device taken on the line 3—3 of FIGURE 2;

FIGURE 4 is a perspective view of one of the arcuate metallic segments; and

FIGURE 5 is a schematic view of the air control system for the movable electrode.

Referring now to FIGURE 1 for the general arrangement of the invention, it will be seen that it includes an upper housing A that supports a conventional fixed hollow metallic electrode B that has a tip 10. A combined water inlet and water discharge fitting C of a conventional design is affixed to the rearward end of the electrode B as shown in FIGURE 1. A cooling water discharge line 12 is connected to the fitting C, as is a water return line 14. Water is circulated through the length of electrode B to the tip 10, to maintain the electrode in a relative cool condition during the welding operation as is common with devices of this kind. Access to the interior of the housing A may be had by removing a cover D that is secured to the upper portion of the housing by bolts 16.

A two-position, four port air valve 18 of conventional design is affixed to the housing A and is disposed thereabove as shown in FIGURES 1 and 5. Four ports 18a, 18b, 18c and 18d are provided in valve 18. The valve 18 includes a movable portion 19 in which two passages 19a and 19b are formed. Port 18a is connected to the air inlet 20 that extends to a source of air under pressure. Port 18b is connected to a hose 24 that terminates in a threaded fitting 26. Port 18c is vented to the ambient atmosphere, and a port 18d is connected to a line 25.

The movable valve portion 19, by spring means (not shown), at all times tends to remain in a first position shown in FIGURE 5 where passage 19a is in communication with ports 18b and 18c, and passage 19b is in connection with ports 18a and 18d. By use of a trigger 22 or other type of actuator, the valve portion 19 can be moved to a second position to place passage 19a in communication with ports 18a and 18b, and passage 19b in connection with ports 18c and 18d.

A horizontal U-shaped support 28 is rigidly affixed to opposite sides of the housing A and extends rearwardly therefrom. The support 28 has a number of eyes 30 projecting outwardly therefrom. The eyes 30 can be removably engaged by hooks 32 that are affixed to cables 34 that extend downwardly from a suitable support (not shown) located inside the building in which the spot welder is disposed. By supporting the spot welder in this manner, which is conventional, the spot welder may be easily moved relative to the work pieces (not shown) that are being welded.

The upper housing A, as can be seen in FIGURE 2, includes four downwardly extending walls 38 that are connected on their lower ends by a base plate 40. The base plate 40 has a number of bores 42 therein in which grommets 44 formed of an electrical insulating material are disposed. The base plate 40 rests on the upper surface of a sheet 46 of an electrical insulating material. The sheet 46 has a number of bores 48 therein that are vertically aligned with the bores 42. The lower portion of the grommets 44 are disposed in the bores 48 as shown in FIGURE 2.

A number of bolts 50 are provided that extend downwardly through the grommets 44 to engage tapped bores 52 formed in the upper portion of a lower housing E. The bolts 50 serve to removably hold the upper housing A and lower housing E together as a unit, as can best be seen in FIGURE 1, but with the upper and lower housings A and E being electrically insulated from one another. The lower housing E has longitudinally aligned first and second cylinders 54 and 56 respectively, formed therein. Cylinders 54 and 56 are separated by a wall 58. The wall 58 has a centrally disposed bore 60 therein that is in communication with the first and second cylinders 54 and 56. At least one circumferentially extending groove 62 is formed in the wall 58 that is in communication with the bore 60. Each of the grooves 62 has an O-ring 64 of a resilient material positioned therein.

A piston rod 66 of substantial length is slidably mounted in the bore 60 and is sealingly engaged by the O-ring 64. The rear end of the piston rod 66 develops into a threaded tubular member 68 which serves to support a piston 70. The piston 70 is held on the threaded member 68 by a nut 72 as shown in FIGURE 2. The piston rod 66 is preferably formed from a copper or an alloy in which copper or a metal having a good electrical conductivity constitutes a major portion thereof.

The rear end of the lower housing E is closed by an end plate 74 which is removably held thereon by a number of bolts 76 that engage tap bores 78 formed in the housing. The end plate 74 has a tapped bore 80 therein that is engaged by the fitting 26. Wall 58 has a flat forward face 82 that defines the rear end of the second cylinder 56. A number of arcuate segments 84 are provided that are formed from a material having excellent electrical conductivity, preferably silver. Each of the segments 84 has a flat rearward face 86 that is in abutting contact with the forward face 82 of wall 58 when the segments are disposed in the second cylinder 56 as shown in FIGURE 2. Each of the segments 84 includes a forward and inwardly tapering surface 88. Each segment 84 also has a curved inner surface 90 as can best be seen in FIGURE 3, that has substantially the same radius of curvature as the exterior surface of the piston rod 66. A tapered ring 92 is disposed in the second cylinder 56 in an encircling position about the piston rod 66, with the most rear extremity of the ring 92 being in contact with the tapered surfaces 88 of the segments 84. A number of Belleville cone spring washers 94 encircle the piston rod 66 in the second cylinder 56 forwardly of the tapered ring 52. The rearmost of these washers 54 is in abutting contact with the forward face of the tapered ring 92. An apertured plug 96 is slidably inserted in the forward portion of the second cylinder 56 and is removably held in place therein by a second end plate 98 that has a centrally disposed bore 100 therein through which the piston rod 66 extends. The second end plate 98 is held on the lower housing E by a number of bolts 102 that extend through bores 104 in the second end plate to engage tapped recesses 106 formed in the lower housing. The plug 96 is of such length that when the bolts 102 are tightened on the lower housing E, the plug is moved rearwardly in the second cylinder 56 to the extent that it compresses the Belleville washers 94, with the compressive force on the washers being transmitted through the tapered ring 92 to the forward tapered surfaces 88 of the segments 84. This force exerted by the tapered ring 92 on the tapered surfaces 88 forces the segments 84 inwardly into pressure contact with the piston rod 66, as well as into pressure contact with the flat forward face 82 of the wall 58. The plug 96 preferably has a circumferentially extending groove 108 formed therein in which an O-ring 110 is disposed that sealingly engages the interior surface of the second cylinder 56. The forward end of the piston rod 66 supports a conventional movable water-cooled electrode assembly F, as can best be seen in FIGURE 1. The assembly F includes a hollow body 112 formed from a metal or alloy having excellent electrical conducting qualities, through which cooling water is circulated.

Water is supplied to the interior of the body 112 by a first flexible hose 114 and after serving to cool the body the water is discharged therefrom through a second hose 116. The body 112 supports a second electrode tip 118. A stud bolt 120 projects outwardly from the lower housing E, as best seen in FIGURE 1, to extend through a bore (not shown) formed in a heavy L-shaped bus bar 122 formed of a good electrical conducting material such as copper or the like. The bar 122 is held on bolt 120 by a nut 124 that forces the bar into pressure contact with the exterior surface of the lower housing E. By means of a bolt 126 or other conventional fastening means the rear end of the bar 122 is connected to a terminal 128 of a heavy electrical conductor 130 that leads to a source of low voltage, high amperage current 132. A second conductor 134 extends from the source of electrical energy 132 to the fixed electrode B and is connected thereto by conventional means.

The line 25, as can be seen in FIGURES 1 and 5, is connected by a conventional fitting 25a to a bore 26c that extends through the lower housing E to communicate with the forward portion of the first cylinder 54. When the movable valve portion 19 is in the first position shown in FIGURE 5, air under pressure flows through air inlet 20, port 18a, passage 19b, port 18b, line 25, and bore 25b to the forward portion of first cylinder 54 to force piston 70 to the right-hand end thereof to separate electrode tips 10 and 118.

By movement of trigger 22, the valve portion 19 can be moved to a second position where passage 19a is in communication with ports 18a and 18b, and passage 19b is in connection with ports 18c and 18d. With the valve portion 19 in the second position, air under pressure flows from air inlet 20 through passage 19a, port 18b, hose 24, fitting 26, and bore 80 into the rear portion of first cylinder 54 to move piston 70 forwardly therein. This forward movement of piston 70 brings the electrode tips 10 and 118 into contact with the work piece (not shown). When the electrode tips 10 and 118 are in contact with the work piece (not shown), current flows to the tip 118 from the conductor 130 through the bus bar 122, lower housing E, segments 84, piston rod 66 and movable electrode assembly F. The apertured plug 96 is preferably formed from a polymerized resin material that is an electrical insulator, so that all current flowing from the conductor 130 to the electrode tip 118 must pass through the segments 84. It will be particularly noted that the segments 84 have rear surfaces 86 of substantial area which are in contact with surface 82. Also, the surfaces 90 in contact with piston rod 66 are of substantial area. Due to the segments 84 being formed from silver, as well as providing a substantial cross-sectional area for the flow of electric current therethrough, but a small resistance is encountered by an electric current in flowing from the lower housing E to piston rod 66. The piston 70 is coated with a layer 70a of a nonelectrical conducting material such as neoprene, to cause the flow of electric current to be from bolt 120 to lower housing E and segments 84 to piston rod 66 and assembly F. It will, of course, be obvious that the lower this resistance, the less heat will be generated as electric current flows through lower housing E to electrode F.

The use and operation of the improved spot welder above described is the same as that of a conventional spot welder, other than that in the present invention the use of a flexible braided electrical conductor is dispensed with, and the lower housing E serves the dual function of not only supporting the movable electrode F, but as an electrical connection therefor.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A spot welder of the type which includes an upper housing that supports a forwardly extending first water-cooled electrode, a lower metallic housing having two longitudinally aligned first and second cylinders therein that are separated by a wall in which a centrally disposed bore is formed, a piston slidably mounted in said first cylinder, a metallic piston rod slidably mounted in said bore and connected on a first end thereof to said piston, which piston rod extends forwardly through said second cylinder, a second water-cooled electrode mounted on the forward extremity of said piston rod, a valve for controlling the flow of compressed air to and from said first cylinder to move said second electrode relative to said first electrode, means for connecting a first conductor of an electric circuit to said first electrode, which spot welder is characterized by:

(a) a plurality of metallic arcuate segments that have a high degree of electrical conductivity that are disposed in said second cylinder, which segments encircle said piston rod and are in contact therewith, said segments having flat rear faces that abut against the forward face of said wall, and outwardly and rearwardly tapering forward faces;

(b) an outwardly and rearwardly tapering ring that encircles said piston rod in said second cylinder and engages said forward faces of said segments, with said ring when forced rearwardly moving said segments into pressure contact with said piston rod;
(c) an apertured plug disposed in a fixed position in the forward end of said second cylinder, which plug slidably engages said piston rod extending longitudinally therethrough;
(d) spring means in said cylinder disposed between said plug and ring which at all times maintains a substantial rearwardly directed force on said ring;
(e) electrically insulated means for supporting said lower housing from said upper housing; and
(f) means for connecting a second conductor of said electric circuit to said lower housing, with said housing, segments and piston rod cooperatively supplying electric energy from said electric circuit to said second electrode to permit the welding of two or more work pieces when disposed between said first and second electrodes and in contact therewith.

2. A spot welder as defined in claim 1 wherein said segments are formed from a metallic material, the major portion of which is silver.

3. A spot welder as defined in claim 1 wherein said piston rod is formed from a metallic material, the major portion of which is copper.

4. A spot welder as defined in claim 1 which further includes:
(g) a ring-shaped plate that abuts against the forward end of said lower housing through which plate said piston rod extends, which plate prevents forward movement of said plug relative said lower housing; and
(h) means for removably holding said plate on said forward end of said lower housing.

5. A spot welder as defined in claim 1 wherein said spring means comprise a plurality of resilient longitudinally tapered washers arranged in pairs with the circumferential edges thereof being in contact, and with the inner portions of each said pairs being in contact with the pairs next adjacent thereto, which piston rod extends through said washers, with the foremost one of said washers being in contact with said plug, and with the rearmost washer being in contact with said ring.

6. A spot welder as defined in claim 1 wherein said electrical insulating means includes:
(g) a sheet of electrical insulating material disposed between said upper and lower housings;
(h) a plurality of grommets formed of an electrical insulating material that are at least partially disposed in bores formed in said sheet and in alignment with tapped bores formed in said lower housing; and
(i) a plurality of bolts that etxend downwardly through said grommets to engage said tapped bores to support said lower housing from said upper housing.

7. A spot welder as defined in claim 1 wherein said apertured plug is formed from an electrical insulating material.

8. A spot welder as defined in claim 1 which further includes:
(g) means for electrically insulating said piston from said lower housing.

9. A spot welder as defined in claim 8 wherein said means comprises a layer of nonelectrical conducting material which covers at least that portion of said piston abutting against the side wall of said first cylinder.

References Cited by the Examiner

UNITED STATES PATENTS

| | | | |
|---|---|---|---|
| 2,256,028 | 9/1941 | Jardine et al. | 219—89 |
| 2,465,456 | 3/1949 | Johnson | 219—89 |
| 2,839,664 | 6/1958 | Fagge | 219—89 |
| 2,906,856 | 9/1959 | Forssmark | 219—89 |

FOREIGN PATENTS

| | | |
|---|---|---|
| 455,775 | 10/1936 | Great Britain. |
| 841,155 | 7/1960 | Great Britain. |

RICHARD M. WOOD, *Primary Examiner*.